UNITED STATES PATENT OFFICE.

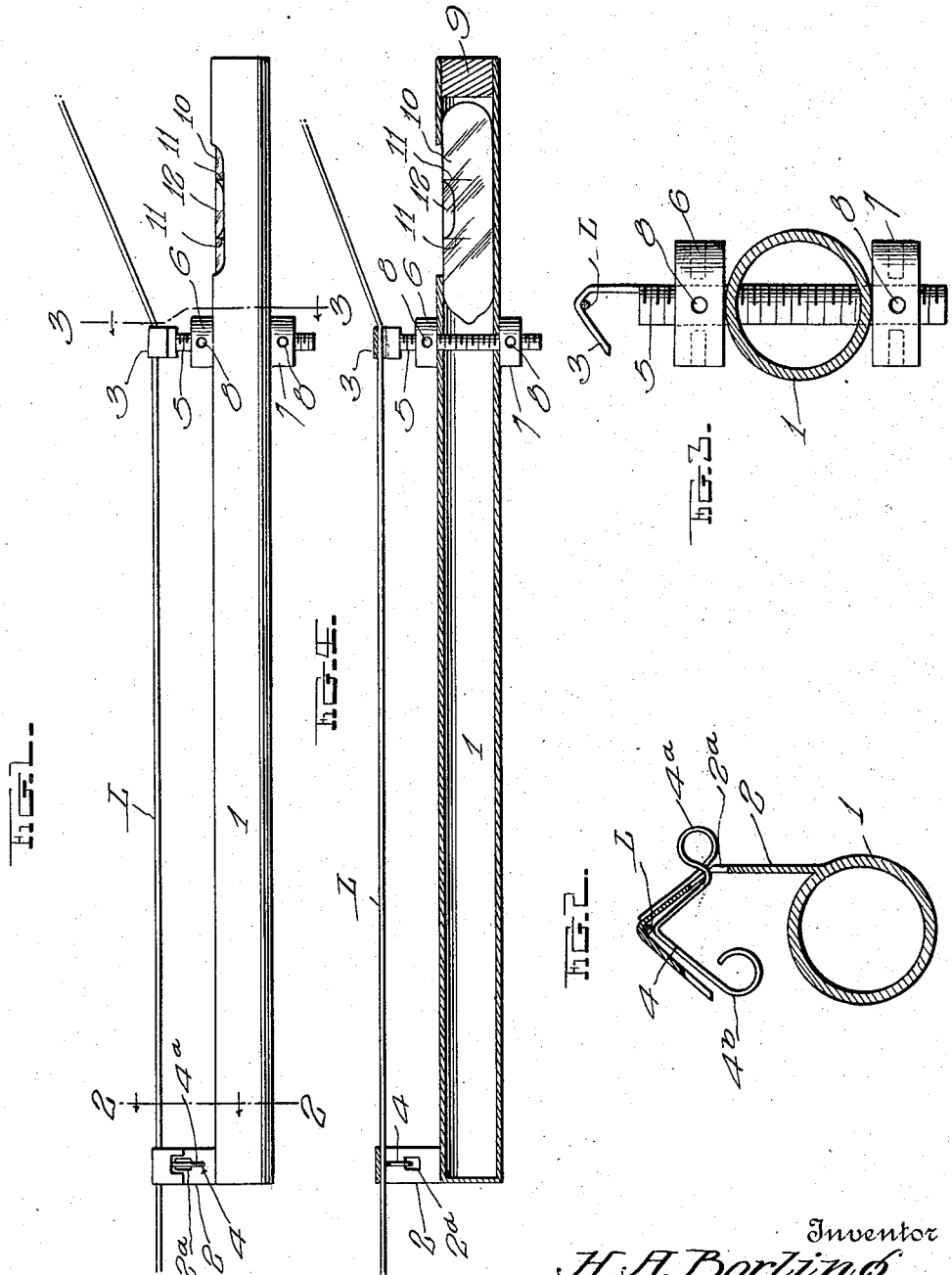

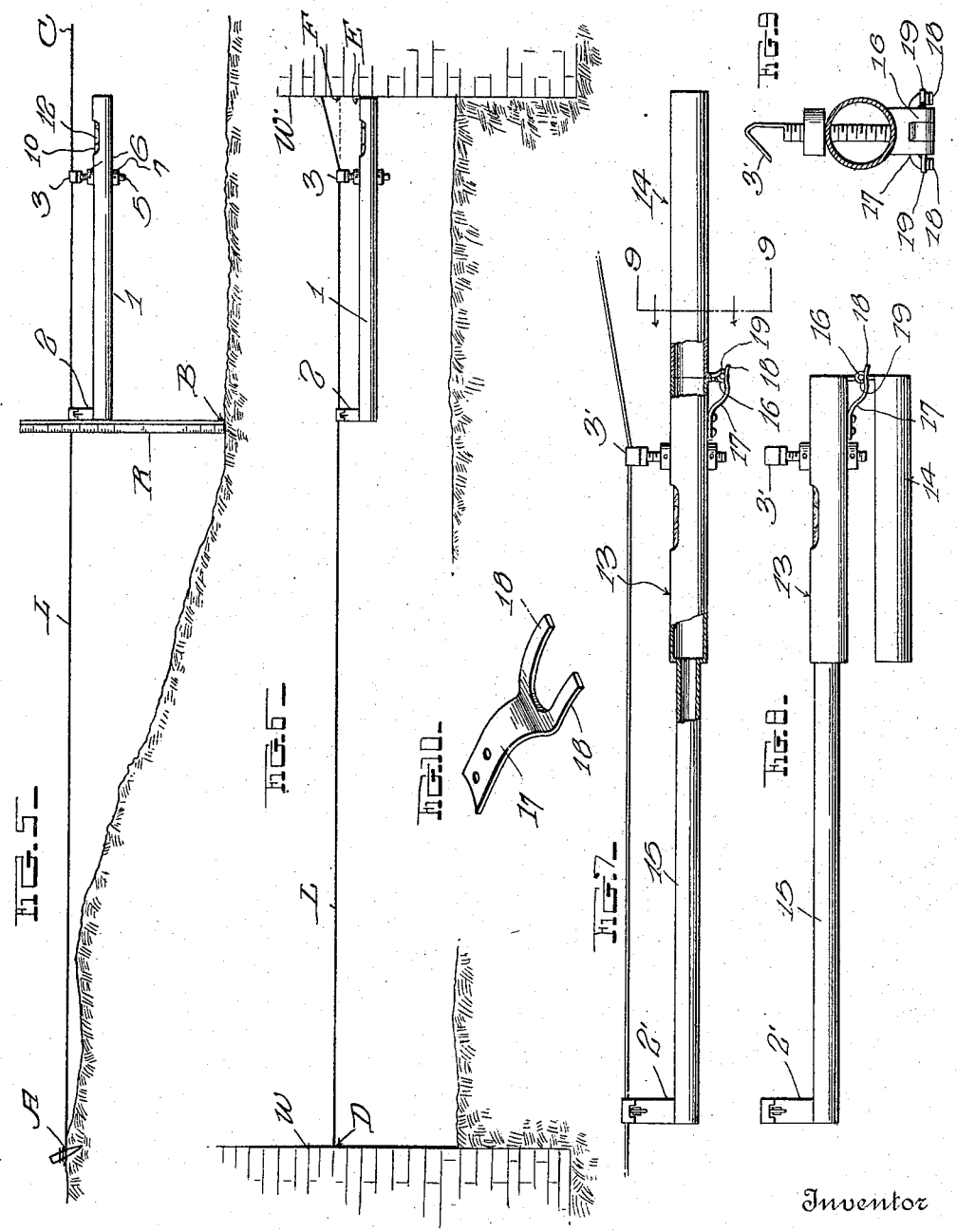

HUBERT A. BORLING, OF CLEVELAND, OHIO.

LINE-LEVEL.

1,201,435.  Specification of Letters Patent.  Patented Oct. 17, 1916.

Application filed December 13, 1915. Serial No. 66,593.

*To all whom it may concern:*

Be it known that I, HUBERT A. BORLING, a citizen of the United States, residing at Cleveland, in the county of Cuyahoga and State of Ohio, have invented certain new and useful Improvements in Line-Levels; and I do declare the following to a full, clear, and exact description of the invention, such as will enable others skilled in the art to which it appertains to make and use the same.

This invention relates to improvements in balanced spirit levels and more particularly to line levels of this character.

The primary object of the invention is to so construct a level of this character that the sagging of the line from which the level is suspended will not in anywise affect the parallelism between the line and the level no matter how long nor how heavy the instrument may be.

Another object is to provide an instrument of this character which is adjustable and requires only one man to operate it.

With these and other objects in view, the invention consists of certain novel features of construction, and the combination and arrangement of parts as will be hereinafter more fully described and claimed.

In the accompanying drawings: Figure 1 represents a side elevation of a line level constructed in accordance with this invention; Fig. 2 is a transverse section taken on the line 2—2 of Fig. 1; Fig. 3 is a similar view taken on the line 3—3 of Fig. 1; Fig. 4 is a central vertical longitudinal section; Fig. 5 is a side elevation showing the application of this improved level for determining the difference in level between two longitudinally spaced points of a surface; Fig. 6 is a similar view showing the level applied to a line stretched between two side walls of a building; Fig. 7 is a side elevation of a level showing a slightly different form of the invention; Fig. 8 is a similar view showing the level in folded inoperative position; Fig. 9 is a transverse section taken on line 9—9 of Fig. 7; Fig. 10 is a detail perspective view of the spring which holds the hinged sections in open and closed positions.

In the embodiment illustrated in Figs. 1 to 6 a spirit level is shown composed of a body member 1 which is preferably hollow and constructed of aluminum to provide for lightness. As shown this member 1 is tubular and may be of any suitable or desired length. This body member 1 is provided with a one point suspension 3 and a steadying element 2 arranged at one side of the suspension element on the tube and constructed in the form of a hook-like clip here shown inverted V-shaped in cross section. A spring clamping member 4 is connected with this slip and is shown in the form of a piece of wire secured at one end by soldering or otherwise to the outer face of the clip and which extends transversely thereof and has a coil $4^a$ formed therein to provide the necessary resiliency. This wire then extends through an opening $2^a$ in the clip and is bent to conform to the cross-sectional contour of the inner face of the clip (see Fig. 2) with its free end bent to form a finger grip $4^b$. The line L on which the level is to be suspended is designed to be clamped between said clamp 4 and the inner face of the clip, for a purpose to be described. The suspension element 3 is also shown in the form of a hook-like clip inverted V-shaped in cross section and which is secured to one end of a screw bolt 5 which extends through the tube 1 at a point spaced inwardly from the end thereof opposite to that which carries the clip 2, said suspension element 3 being so positioned on the tube as to balance the level body or tube when said element 3 is engaged with the supporting line L whereby the level and the line will be in parallelism at all times as no weight is exerted on the line at the point where it is engaged by the clip 2 of the level, said clip serving only as a steadying device to prevent the level from oscillating.

As shown the bolt 5 is provided on opposite sides of the tube 1 with clamping nuts or burs 6 and 7 which are provided at the side edges thereof with a plurality of apertures 8 to receive an adjusting pin (not shown). By so connecting this bolt with the tube it will be obvious that the clip 3 carried by one end thereof may be adjusted a greater distance toward or away from the tube 1 as may be desired and when so adjusted it is held in adjusted position by these nuts 6 and 7. This clip 3 is made adjustable to adapt it to be positioned in longitudinal alinement with clip 2.

A weight 9 is carried by the end of the tube 1 opposite that on which the clip 2 is mounted and may be of any suitable or desired construction, being herein shown in the form of a mass of lead inserted in said tube end and which is designed to provide for the balancing of the level from the point of suspension 3. It will thus be observed that when the suspension element 3 and steadying device are engaged with the line L that the level body will be balanced at the point 3 and consequently no weight will be exerted at the end of the level carrying the clip 2 and the level will be parallel with the line on the side of the suspension member on which the steadying device is mounted, as is shown in Fig. 6, and if the spring 4 were not provided, the clip 2 would be liable to become disengaged from the line. Should said clip be disengaged the end of the tube on which it is mounted would swing slowly and gently above and below the line L owing to the balancing of the level at its other point of of suspension 3.

A spirit tube 10 is supported within the tubular body portion of the level and is visible through an opening formed in the upper face of said tube and is provided with the usual hair lines 11 such as are employed in instruments of this character and which has the usual air bubble 12. As shown this spirit tube 10 is disposed between the weight end 9 of the instrument and the balancing suspension element 3 thereof.

In the use of this improved level when it is desired to determine the difference in level between two points A and B shown in Fig. 5, the line L is secured at one end at the point A by any suitable means and the line is arranged horizontally above the surface to be measured and held at C by the hand of the operator or by any other suitable means. The level 1 is then mounted on the line by engaging the hooks 2 and 3 therewith and the line is raised or lowered at the end C in accordance with the indication of the level bubble. After the line has been so adjusted that the bubble indicates it to be exactly level or horizontal, a ruler or other measuring instrument R is placed with one end engaging the surface of the object to be measured and said ruler is placed perpendicular adjacent the end of the level carrying the clip 2 and the number of inches indicated between the end of the ruler which engages the object to be measured and the line L will determine the difference of the level between the points A and B.

In Fig. 6 this improved level is shown applied to a line L stretched between two walls W and W' of a building it being desired to determine the points on wall W' which is level with point D on wall W. To ascertain this level the line is secured at one end at point D on wall W and stretched across to wall W' and held by one hand. The level is then suspended on said line near wall W' with its free or weighted end abutting said wall, and the free end of the line is adjusted vertically until the spirit-bubble is centered, thereby indicating that the line between the point D and the suspension element 3 of the level is horizontal or level. Then to determine the point on wall W' which is level with the point D on wall W the distance between the level and the line L where it is engaged by the suspension element 3 is measured and we will assume that it measures one inch. Then the point where the weighted end of the level engages the wall W' is marked being here lettered E and the point on wall W' which is level with the point D on wall W is one inch above the point E as indicated at F.

It is important that the steadying device 2 be employed in order that the level may be held parallel with the line L as without it the balanced level would be useless.

In the form shown in Fig. 7 the level body is shown constructed in two hingedly connected sections 13 and 14, the front section 13 being preferably provided with a reduced extension 15 at the free end of which is mounted a steadying element 2' which is similar to the element 2 of the other figures. Adjacent the hinged end of the section 13 is the other suspension element 3' which is similar in construction to the element 3 of the figures. The hinge 16 which connects the sections 13 and 14 is equipped with a spring 17 for holding section 14 in either extended or folded position as may be desired. This hinging of the sections 13 and 14 is designed to adapt the instrument, when a very long one is employed, to be collapsed into a small space when not in use. As shown this spring 17 is in the form of a resilient metal strip which is secured at one end to the lower face of the hinged end of section 13. The other end of this spring is offset and bifurcated to adapt it to straddle the knuckle of the hinge member which is carried by section 13 and the furcations 18 thereof engage two laterally extending studs 19 which project from opposite side edges of the hinge member carried by the tube section 14. (See Fig. 9). Thus it will be seen that these furcations yieldably engage these studs at all times and hold the section 14 of the tube in both open and closed positions. In this form of the level the spirit bubble 12 is arranged between the points 2' and 3' instead of at the rear of the point 3' as in the other figures so that the accuracy of the instrument will not be impaired should wear occur in the hinge.

I claim as my invention:

1. A line level having a line-engaging one-point suspension element arranged intermediately of the ends thereof with the weight of said level equally disposed on opposite sides of said element to provide for the balancing of said level when suspended, and a steadying device arranged on said level at a point spaced from said suspension element and adapted to engage a supporting line.

2. A line level having a line-engaging one-point suspension element arranged intermediately of the ends thereof with the weight of said level equally disposed on opposite sides of said element to provide for the balancing of said level when suspended, and steadying means carried by one end of said level for engaging the supporting line.

3. A spirit level having a suspension element mounted at one end thereof and provided with a spring clamping jaw, another suspension element mounted on said level intermediately of the ends thereof and adjustable toward and away from the level, said intermediately disposed suspension element being in the form of an inverted V-shaped clip having a threaded shank adjustably mounted in the level, and clamping nuts arranged on said shank on opposite sides of said level for holding the shank in adjusted position.

4. A spirit level having a suspension element mounted at one end thereof and provided with a spring clamping jaw, another suspension element mounted on said level intermediately of the ends thereof and adjustable toward and away from the level, said intermediately disposed suspension element being in the form of an inverted V-shaped clip having a threaded shank adjustably mounted in the level, clamping nuts arranged on said shank on opposite sides of said level for holding the shank in adjusted position, and a weight carried by said level at the rear of the adjustable suspension element to assist in balancing the level.

5. A spirit level having a steadying member extending laterally from one end thereof, a suspension element extending laterally from said level intermediately of its ends and adjustable transversely thereof to position it in alinement with said steadying member, said adjustable element being positioned with the weight of the level arranged equally on opposite sides thereof.

6. A line level comprising a tubular body portion, an inverted V-shaped clip carried at one end thereof with a spring clamping jaw arranged inside said clip to receive a line between it and the clip, a line engaging hook mounted on said tubular member intermediately of the ends thereof and having a threaded shank extending through said member, adjusting nuts arranged on said shank on opposite sides of said tubular member, a weight carried by said tubular member at the end thereof opposite to that which carries the first mentioned suspension element, and a spirit tube arranged in said tubular member.

7. A line level having suspension elements, one of which is arranged intermediately of the ends thereof, said level being constructed in hingedly connected sections with means for holding said sections yieldably in open or closed position.

8. A line level having suspension elements, one of which is arranged intermediately of the ends thereof, said level being constructed in hingedly connected sections, studs extending laterally from the hinge member of one section and a spring secured at one end to the other section with its free end bifurcated and the furcations thereof engaging said studs.

In testimony whereof I have hereunto set my hand in presence of two subscribing witnesses.

HUBERT A. BORLING.

Witnesses:
RAYMOND E. WHITE,
L. O. SPROSTY.